May 5, 1925.

C. J. SMITH 1,536,535

LOADING APPARATUS

Filed April 27, 1923    2 Sheets-Sheet 1

INVENTOR.
C. J. Smith
BY F. N. Barber
ATTORNEY

May 5, 1925.
C. J. SMITH
1,536,535
LOADING APPARATUS
Filed April 27, 1923    2 Sheets-Sheet 2
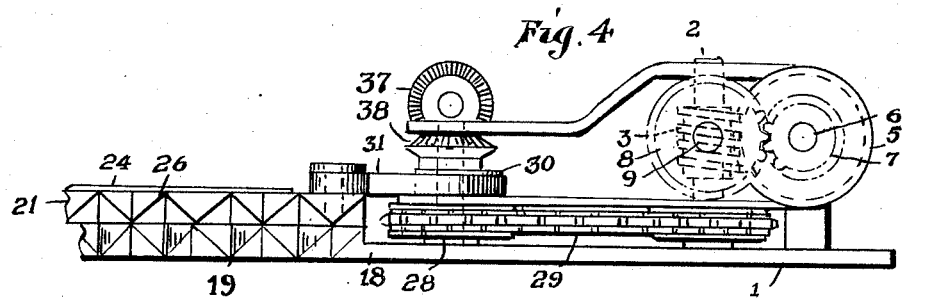
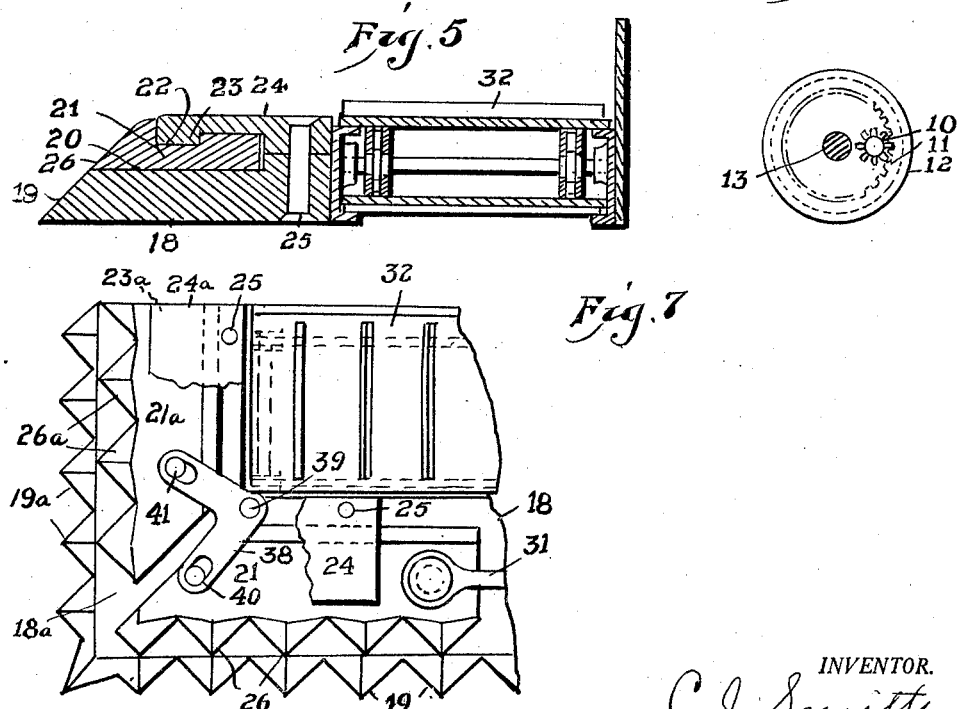
INVENTOR.
C. J. Smith
BY F. N. Barber
ATTORNEY Patented May 5, 1925.

UNITED STATES PATENT OFFICE.

1,536,535

CLYDE J. SMITH, OF UNIONTOWN, PENNSYLVANIA.

LOADING APPARATUS.

Application filed April 27, 1923. Serial No. 635,001.

*To all whom it may concern:*

Be it known that I, CLYDE J. SMITH, a citizen of the United States, residing at Uniontown, in the county of Fayette and State of Pennsylvania, have invented new and useful Improvements in Loading Apparatus, of which the following is a specification.

My invention relates broadly to loading apparatus, but more particularly to apparatus for transferring material, such, for example, as coal, from a loose broken mass or pile to a selected place of deposit, such as a car, for example.

It is the object of this invention to provide an apparatus that will work its way beneath a loose mass or pile of coal or other material and carry away the same as the apparatus advances. Another object is to facilitate the advance of the apparatus by agitating the material close to the most advanced portion of the particular element which is pushed into or beneath the said material.

Figure 1:
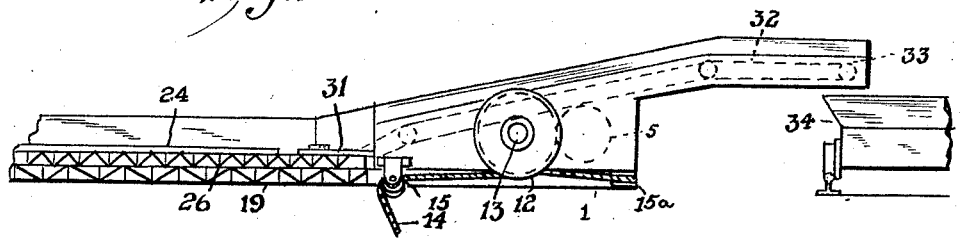
Figure 2:
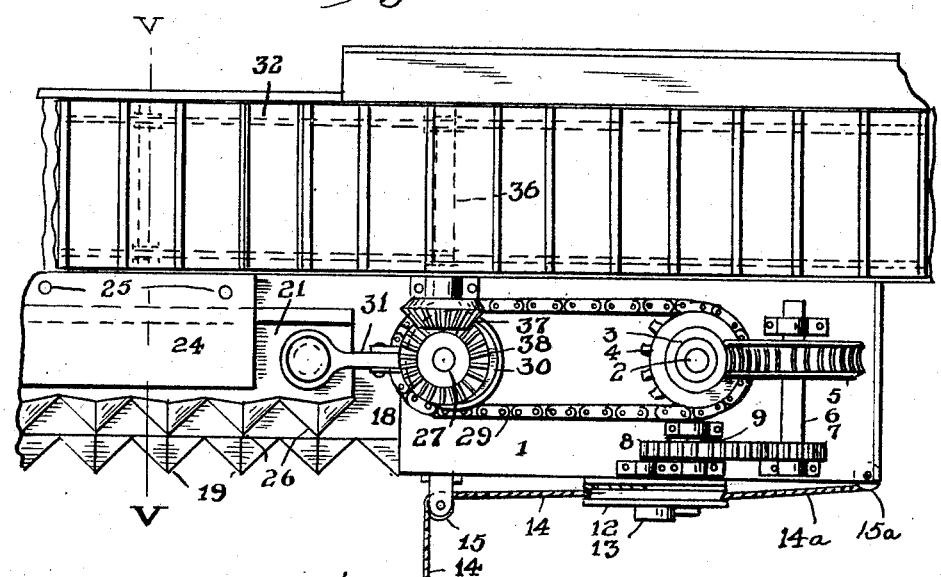
Figure 3:
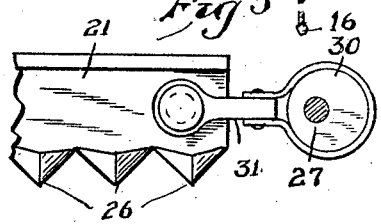

Referring to the accompanying drawing, Fig. 1 is a front view of an apparatus embodying my invention; Fig. 2, an enlarged plan view of Fig. 1, the casing being omitted and parts being broken away; Fig. 3, a detail plan of the agitator-bar operating connections; Fig. 4, an enlarged front view of my invention, the casing being omitted and parts being broken away; and Fig. 5, a cross-section on the line V—V of Fig. 2; Fig. 6 is a section of a detail, and Fig. 7 is a fragmentary view showing in plan view a portion of a modification of my invention.

On the drawing, 1 designates the frame which supports the various movable parts of my loading apparatus. 2 is the main drive-shaft rotated by any suitable means. The shaft 2 carries the worm 3 and the sprocket-wheel 4. The worm 3 drives the worm-wheel 5 on the shaft 6, which carries the pinion 7 meshing with the spur-gear 8 on the shaft 9. The latter carries the pinion 10 which meshes with the internal gear-teeth 11 on the drum 12 turning on the stub-shaft 13 projecting from the frame 1. The drum 12 is provided with the rope 14 which passes over the sheave 15 attached to the frame 1 and has its outer end connected to a suitable anchor 16.

The frame 1 has the extension bar 18 which, though it might be pivotally connected to the frame, is shown rigid therewith. This bar has its forward edge beveled upwardly and rearwardly and provided with the teeth 19. Back of the teeth 19 the bar has the longitudinal groove 20 in which the agitator-bar 21 reciprocates, the upper face of the latter having a longitudinal groove 22 in which the rib 23 on the lower face of the cap-plate 24 rests, the latter being secured to the bar 18 by the rivets or bolts 25. The agitator-bar 21 has on its forward edge the teeth 26 beveled upwardly and rearwardly and having their forward points about on the rear ends of the teeth 19, the inclines of the teeth 19 and 26 being shown on Fig. 4 as being in the same plane.

27 is a vertical shaft between the shaft 2 and the agitator-bar 21. It carries the sprocket-wheel 28 connected to the sprocket-wheel 4 by the sprocket-chain 29. The shaft 27 carries the eccentric 30 which drives the pitman 31 connected to the agitator-bar 21.

At the rear side of the apparatus I secure the endless carrier 32, running parallel with the bar 18 and the rear of the main part of the apparatus. It runs horizontally along the back of the bar 18 with its upper member at about the level of the upper surface of the bar. At about the junction of the bar with the main portion of the frame 1 the carrier rises so that it may have its delivery end 33 arranged over the car 34. The carrier is operated by the sprocket-wheels on the shaft 36 having the bevel-gear 37 meshing with the bevel-gear 38 on the shaft 27.

When the drive shaft 2 is driven by a suitable motor (not shown), it causes the agitator-bar 21 to reciprocate and the drum 12 to rotate. The latter causes the rope 14 to be wound thereon and the entire apparatus to be drawn transversely of the bar 18. If a mass of broken coal is in front of the bar 18, the latter will be drawn under or into it, the agitator-bar 21 operating to lift and agitate the coal so as to facilitate the advance of the apparatus. As the apparatus advances, the coal reaches the endless carrier 32 and is carried thereby to the car 34 or other place of deposit.

I do not confine this invention, except as specifically claimed, to the means shown for moving the apparatus and the agitator-bar during the loading operation, as various other means than those shown may be readily devised. The loading apparatus is particularly useful to load coal that has been broken or shot in mines by an explosive, but it may obviously be used for other purposes. I have not shown the apparatus with a motor and its controlling means nor have I shown various other control means, as clutches, as these are all well known in coal-mining machinery having some functions similar to some of those exercised in my invention.

In the modification of my invention as shown in Fig. 7, I provide a second agitating mechanism placed opposite the end of the carrier 32 and at right angles to the agitating mechanism already described. This second mechanism comprises the rigid extension bar or shoe 18$^a$ arranged at right angles to the bar or shoe 18 and at the outer end thereof and opposite the end of the carrier 32. The shoe 18$^a$ has its outer edge provided with the beveled teeth 19$^a$ like the teeth 19. Back of the teeth 19 the bar 19$^a$ carries the agitator bar 21$^a$ which reciprocates on the shoe 18 and is connected thereto in the same manner as the bar 21 is connected to the shoe 18 and has the beveled teeth 26$^a$. It has the rib 23$^a$ and the cap-plate 24$^a$ corresponding to the rib 23 and the cap-plate 24.

38 is a bell-crank lever carried by the pivot-pin 39 secured to the bar 18. One arm of the lever 38 is pivoted on the pin 40 on the agitator bar 21 and the other arm is pivoted on the pin 41 on the agitator bar 21$^a$, so that when the bar 21 reciprocates the bar 21$^a$ also reciprocates.

By means of the drum 12 and the wire ropes 14 and 14$^a$ running over the sheaves 15 and 15$^a$, the machine may, when the ropes are anchored suitably, cause the machine to move bodily in any selected direction. By moving the machine in one direction the bar 19 may be advanced at right angles to its length into a mass of broken coal and by moving it in another direction the bar 19$^a$ may be similarly advanced. Thus, one bar may advance a certain distance and then the machine may advance in a direction at right angles to its former direction, and while advancing in each direction, coal is being delivered to the carrier. The means for advancing the machine may comprise more drums, ropes and sheaves than those shown, as those acquainted with mining machinery know.

I claim—

1. In a loading machine, a movable frame carrying a shoe arranged to move beneath a mass of loose material, a beveled toothed material agitating and lifting device slidable on the shoe at right angles to the movement of the latter, means to reciprocate said device and a carrier to receive the material under which the shoe and agitator have moved.

2. In a loading machine, a movable frame carrying a shoe arranged to move beneath a mass of loose material, a beveled toothed agitator slidable on the shoe at right angles to the movement of the latter, a second shoe carried by the frame and arranged at an angle to the first bar, an agitator movable on the second shoe, and means for moving the frame at right angles to each shoe.

In testimony whereof, I hereunto affix my signature this 7th day of April, 1923.

CLYDE J. SMITH.